(12) United States Patent
Matsubara et al.

(10) Patent No.: US 10,162,739 B2
(45) Date of Patent: Dec. 25, 2018

(54) TEST CASE GENERATION SYSTEM AND RECORDING MEDIUM WHEREIN TEST CASE IS RECORDED

(71) Applicant: HITACHI AUTOMOTIVE SYSTEMS, LTD., Hitachinaka-shi, Ibaraki (JP)

(72) Inventors: Masahiro Matsubara, Tokyo (JP); Atsuhiro Ohno, Ibaraki (JP); Mamoru Nemoto, Ibaraki (JP)

(73) Assignee: HITACHI AUTOMOTIVE SYSTEMS, LTD, Hitachinaka-Shi (JP)

( * ) Notice: Subject to any disclaimer, the term of this patent is extended or adjusted under 35 U.S.C. 154(b) by 0 days.

(21) Appl. No.: 15/308,299

(22) PCT Filed: Jun. 3, 2015

(86) PCT No.: PCT/JP2015/065964
§ 371 (c)(1),
(2) Date: Nov. 1, 2016

(87) PCT Pub. No.: WO2016/002417
PCT Pub. Date: Jan. 7, 2016

(65) Prior Publication Data
US 2017/0046252 A1 Feb. 16, 2017

(30) Foreign Application Priority Data
Jun. 30, 2014 (JP) ................ 2014-134156

(51) Int. Cl.
*G06F 9/44* (2018.01)
*G06F 9/45* (2006.01)
*G06F 11/36* (2006.01)

(52) U.S. Cl.
CPC ...... *G06F 11/3684* (2013.01); *G06F 11/3608* (2013.01)

(58) Field of Classification Search
CPC .............. G06F 11/3608–11/3696; G06F 11/28
See application file for complete search history.

(56) References Cited

U.S. PATENT DOCUMENTS 6,499,132 B1 * 12/2002 Morley ................. G06F 17/504
714/38.13
7,340,725 B1 * 3/2008 Robinson ....... G01R 31/318371
717/124

(Continued)

FOREIGN PATENT DOCUMENTS

JP 2009-251936 A 10/2009
JP 2010-102624 A 5/2010

(Continued)

OTHER PUBLICATIONS

Cristian Cadar, Symbolic Execution for Software Testing: Three Decades Later, 2013, pp. 1-10.*

(Continued)

*Primary Examiner* — Mongbao Nguyen
(74) *Attorney, Agent, or Firm* — Foley & Lardner LLP

(57) ABSTRACT

A system in which a pass/fail criterion can be expressed using a temporal logic formula when testing object code is provided. The system includes a control content generation part for generating information regarding test execution control content from execution path information retrieved from an object to be inspected, which is object code or an executable file model. The system further includes a pass/ fail condition generation part for generating information regarding a pass/fail condition from the execution path information and an inspection formula, including a temporal component, for the object to be inspected. The system also includes a test case generation part for generating a test case having a corresponding pass/fail condition for the inspection formula from the information regarding the test execution (Continued)

control content and the information regarding the pass/fail condition.

12 Claims, 8 Drawing Sheets

(56) References Cited

U.S. PATENT DOCUMENTS

| | | | | |
|---|---|---|---|---|
| 7,506,312 | B1* | 3/2009 | Girolami-Rose | G06F 8/71 717/101 |
| 7,873,945 | B2* | 1/2011 | Musuvathi | G06F 11/3688 717/104 |
| 8,146,057 | B1* | 3/2012 | Michelsen | G06F 11/3672 717/124 |
| 8,347,271 | B1* | 1/2013 | Nallasivam | G06F 11/3684 717/132 |
| 8,495,574 | B2* | 7/2013 | Harding | G06F 11/3676 717/124 |
| 8,683,441 | B2* | 3/2014 | Keidar-Barner | G06F 9/44589 717/124 |
| 2005/0223357 | A1* | 10/2005 | Banerjee | G06F 11/3676 717/120 |
| 2006/0010429 | A1* | 1/2006 | Ihara | G06F 8/10 717/126 |
| 2006/0195444 | A1* | 8/2006 | Sastry | G06F 17/30539 |
| 2006/0218534 | A1 | 9/2006 | Kahlon et al. | |
| 2008/0288925 | A1* | 11/2008 | Huang | G06F 11/3684 717/128 |
| 2009/0007077 | A1* | 1/2009 | Musuvathi | G06F 11/3688 717/130 |
| 2010/0083233 | A1* | 4/2010 | Vanoverberghe | G06F 11/3612 717/126 |
| 2010/0125832 | A1* | 5/2010 | Prasad | G06F 11/3604 717/124 |
| 2013/0159974 | A1* | 6/2013 | Norton | G06F 11/3684 717/124 |
| 2013/0275946 | A1* | 10/2013 | Pustovit | G06F 11/3684 717/124 |
| 2013/0326485 | A1* | 12/2013 | Ghosh | G06F 8/313 717/126 |
| 2014/0053134 | A1* | 2/2014 | Wiggers | G06F 11/3608 717/124 |
| 2014/0053139 | A1* | 2/2014 | Prasad | G06F 9/44589 717/131 |
| 2014/0082594 | A1* | 3/2014 | Li | G06F 8/436 717/126 |
| 2014/0229918 | A1* | 8/2014 | Fujiwara | G06F 11/3684 717/124 |
| 2014/0359362 | A1* | 12/2014 | Lu | G06F 11/3692 714/33 |
| 2015/0007138 | A1* | 1/2015 | Sabetta | G06F 11/3684 717/124 |
| 2015/0186251 | A1* | 7/2015 | Friedler | G06F 11/3672 717/124 |
| 2015/0269061 | A1* | 9/2015 | Li | G06F 11/3684 717/131 |
| 2015/0293831 | A1* | 10/2015 | Li | G06F 11/36 717/124 |

FOREIGN PATENT DOCUMENTS

| | | | |
|---|---|---|---|
| JP | 2010-250669 A | | 11/2010 |
| JP | 2014191652 | * | 10/2014 |

OTHER PUBLICATIONS

Cyrille Artho, Combining test case generation and runtime verification, 2004, pp. 1-26.*
Yongyan Zheng, A Model Checking based Test Case Generation Framework for Web Services, 2007, pp. 1-6.*
Andreas Griesmayer, Dynamic Symbolic Execution for Testing Distributed Objects, 2009, pp. 1-15. https://pdfs.semanticscholar.org/6bc5/a1ca2b550b717c04f8a423d527d3aa1bf353.pdf (Year: 2009).*
Gregoire Hannon, Generating Efficient Test Sets with a Model Checker, 2004, pp. 261-270. http://www.csl.sri.com/users/rushby/papers/sefm04.pdf (Year: 2004).*
Ting Su, Automated Coverage-Driven Test Data Generation Using Dynamic Symbolic Execution, 2014, pp. 1-10. https://www.lab301.cn/caut/files/coverage_driven_testing.pdf (Year: 2014).*
Lingming Zhang, Test Generation via Dynamic Symbolic Execution for Mutation Testing, 2010, pp. 1-10 https://www.utdallas.edu/~lxz144130/publications/icsm2010.pdf (Year: 2010).*
Written Opinion of the International Searching Authority issued in application no. PCT/JP2015/065964 dated Aug. 4, 2015 (English translation).
International Search Report issued in application No. PCT/JP2015/064964 dated Aug. 4, 2015.
Bolong et al., "A unified framework for evaluating test criteria in model-checking-assisted test case generation," Information Systems Frontiers, vol. 16, No. 5, 2013, pp. 823-834.
Supplementary European Search Report issued in corresponding application No. 15 81 6004.4 dated May 16, 2018.
Supplementary European Search Report issued in corresponding application No. 15 81 6004.1 dated May 16, 2018.
Office Action dated Jul. 4, 2018 in Chinese Patent Application No. 201580023480.6 with its English translation.
Artho et al., "Combining test case generation and runtime verification", Theoretical Computer Science, Dec. 31, 2015, pp. 209-234.

* cited by examiner

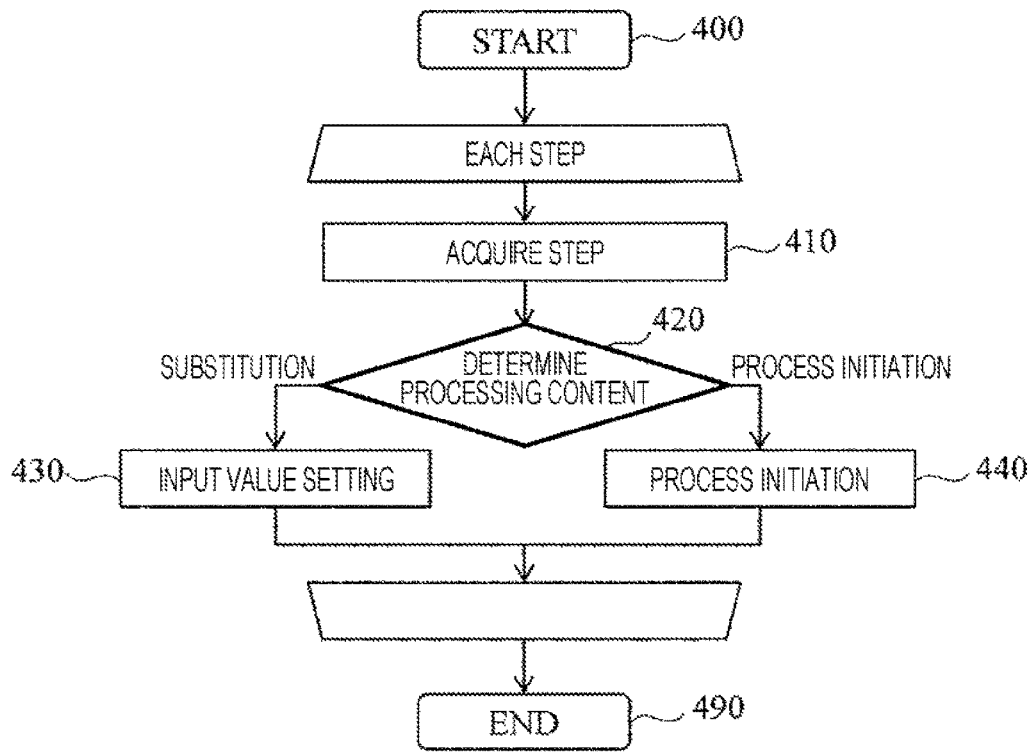
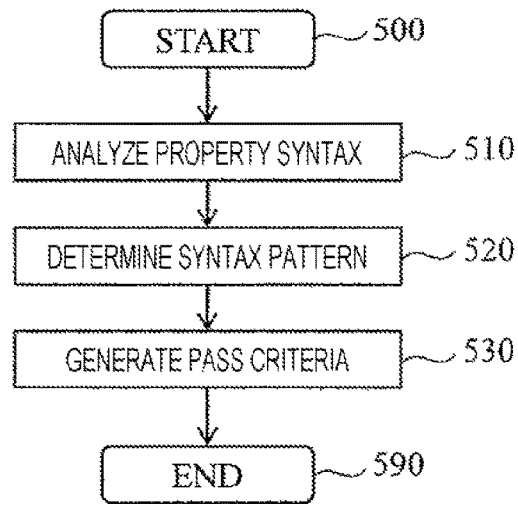

*FIG. 6*

| No. | PROPERTY SYNTAX FORM | PASS CRITERIA | RELATION BETWEEN DETERMINATIONS |
|---|---|---|---|
| R1 | G ( expr ) | DETERMINE expr AT ENTRANCE OF EACH FUNCTION | AND |
| R2 | F ( expr ) | DETERMINE expr AT ENTRANCE OF EACH FUNCTION | OR |

FIG. 7

710
```
001: int  a = 0, x = 0;
002:
003: void func1 ( void ) {
004:    if ( a ) {
005:       x = 1;
006:    }
007:    else {
008:       x = 0;
009:    }
010: }
011:
012: void  main ( void ) {
013:    a = DI0;
014:    func1 ( );
015: }
```

720
```
001: int  a, x;
002:
003: inline func1 ( ) {
004:    if
005:    :: (a != 0) -> x = 1;
006:    :: else -> x = 0;
007:    fi;
008:
009: inline main ( ) {
010:    if
011:    :: true -> a = 0;
012:    :: true -> a = 1;
013:    fi;
014:
015:    func1 ();
016: }
017:
018: active proctype p0 ( ) {
019:    main ();
020:    assert(0);
021: }
```

730
```
001: if true (L011)
002: a = 1 (L012)
003: if ( a != 0 ) (L005)
004: x = 1 (L005)
005: assert(0) violated (L020)
```

FIG. 8

| No. | PROCESSING TYPE | PROCESSING CONTENT |
|---|---|---|
| 1 | TRIGGER | main IN |
| 2 | INPUT VALUE SETTING | a = 1 |

810 (811, 812, 813)

| No. | PROCESSING TYPE | PROCESSING CONTENT |
|---|---|---|
| 1 | TRIGGER | main IN |
| 2 | PASS DETERMINATION | x <= 1 |
| 3 | TRIGGER | func1 IN |
| 4 | PASS DETERMINATION | x <= 1 |
| 5 | TRIGGER | func1 OUT |
| 6 | PASS DETERMINATION | x <= 1 |
| 7 | TRIGGER | main OUT |
| 8 | PASS DETERMINATION | x <= 1 |

820 (821, 822, 823)

| No. | PROCESSING TYPE | PROCESSING CONTENT |
|---|---|---|
| 1 | TRIGGER | main IN |
| 2 | PASS DETERMINATION | $x <= 1$ |
| 3 | INPUT VALUE SETTING | $a = 1$ |
| 4 | TRIGGER | func1 IN |
| 5 | PASS DETERMINATION | $x <= 1$ |
| 6 | TRIGGER | func1 OUT |
| 7 | PASS DETERMINATION | $x <= 1$ |
| 8 | TRIGGER | main OUT |
| 9 | PASS DETERMINATION | $x <= 1$ |

TEST CASE GENERATION SYSTEM AND RECORDING MEDIUM WHEREIN TEST CASE IS RECORDED

TECHNICAL FIELD

The present invention relates to a test case generation system for checking software, and a recording medium in which a test case is recorded.

BACKGROUND ART

With an increase in scale of software installed in a system, it is becoming more difficult to check all software specifications or codes through review or conduct a test thereof. In addition, in software that performs a concurrent operation, a defect may be generated due to processing timing, and there is a difficulty in detecting such a defect through a test. A method of applying model checking, which is a formal verification method, is present as a measure against the above-mentioned problem.

In model checking, a design corresponding to a checking object, specifically, software specifications or source code is expressed using a format specification descriptive language (hereinafter which will be referred to as a "verification model"). In addition, a required characteristic for the checking object is expressed as a property using a temporal logic formula which is a logic formula having a concept of time and an operator, or is expressed as an assertion by a logic formula not having a concept of time. When these verification models and a checking formula indicated by the property or the assertion are input to a model checker which is a tool operating on a computer, whether the required characteristic for the checking object is satisfied is determined by a mathematical technique such as a comprehensive state search. In addition, when the required characteristic is not satisfied, a counterexample is derived.

Meanwhile, source code is compiled and converted into object code, and is installed in a system as an executable format combined in a particular format. In this process, even when there is no defect in the source code, a defect may be generated in the object code due to an influence of optimization or a bug of a compiler. In addition, a product developer desires to verify whether defectiveness is present in the object code which is a final form of software. For this reason, application of model checking to the object code is useful when model checking is applicable to the object code. However, model checking with respect to the object code has a technical difficulty since expression of code is different according to a computer on which the object code operates, and is not common. Further, there are few tools for expression.

A technology for generating a test case by applying model checking is present as a measure against this problem. The model checker has a function of comprehensively searching for an available action or an execution path of a checking object through a verification model, and thus this function is used in a test case generation technology. A mechanism is described below.

A verification model is constructed from source code which is a source of object code set as a checking object, and a property or an assertion corresponding to "an end point of an execution path desired to be tested is not reached" is defined with respect to the end point in the source code. With regard to an input of the property or the assertion, a model checker outputs an execution path reaching the end point as a counterexample. For example, checking is executed by describing "assert (false)" at a finally executed point in the verification model using Simple Promela Interpreter (SPIN) in the model checker. When there is a case in which the point at which the assertion is described is executed, a trace corresponding to information related to an execution path from the point at which execution starts to the point at which execution ends is output as one or a plurality of counterexamples. One trace corresponds to one test case (may correspond to a plurality of test cases in which an execution condition is changed). This trace includes substitution for a variable which is non-deterministically selected in the middle, that is, input value determination or an execution order when a plurality of processes is present. This trace is converted into data for execution of a test, and is set as an input of a system in which the object code corresponding to the checking object is executed on a real machine or a simulator. This data is a test case or a part of the test case. A test case is data indicating a test condition. Herein, an expression "a part of the test case" is used since the data converted from the trace does not include a pass criterion or some execution conditions of a program set as a checking object.

This test case generation technology may include execution paths, and thus may be expected to have a similar effect to that of a technology in which model checking is performed with respect to object code. PTL 1 is present as a prior art that performs test case generation applying model checking.

CITATION LIST

Patent Literature

PTL 1: JP 2010-102624 A

SUMMARY OF INVENTION

Technical Problem

In model checking of source code, a pass criterion may be expressed using a temporal logic formula. However, at the time of checking object code, every single test is executed in a real machine or a simulator, and thus a pass criterion may not be expressed using a temporal logic formula. In model checking, "always" or "future" corresponding to an operator of a temporal logic formula is treated, and thus a logic formula is evaluated at all control points (execution steps in model checking). However, in a test of object code, pass determination is evaluation of a logic formula at predetermined timing. Normally, a logic formula for pass determination is evaluated only at one point after execution in many cases. For this reason, a temporal logic formula may not be input as a pass criterion to a system that executes a test using a real machine or a simulator, and evaluation of a characteristic including a concept of time expressed by the temporal logic formula may not be implemented.

An object of the invention is to provide a technology capable of expressing a pass criterion using a temporal logic formula when object code is tested.

Solution to Problem

For example, a configuration described in claims is employed to solve the above-mentioned problem. The present application includes a plurality of means to solve the above issue, and according to an example thereof, there is provided a test case generation system including: a control content generator that generates information related to test execution control content from execution path information searched from a model of an executable file or object code corresponding to a checking object; a pass criteria generator that generates information related to pass criteria including a set of a criterion formula having no time element and a timing of executing the criterion formula from the execution path information, and a checking formula including a time element with respect to the checking object; and a test case generator that generates a test case having the pass criteria corresponding to the checking formula from the information related to the test execution control content and the information related to the pass criteria.

According to another example, there is provided a computer-readable recording medium recording data having a data structure of a test case used to cause a computer to execute a process of checking an executable file or object code corresponding to a checking object, the data structure including information related to test execution control content and information related to pass criteria including a set of a criterion formula having no time element and a timing of executing the criterion formula.

Advantageous Effects of Invention

According to the invention, a pass criterion may be expressed using a temporal logic formula when object code is tested. In this way, content that can be checked is widened when compared to a case in which only a logic formula having no concept of time is present. When checking of object code in a test case generated by applying model checking is combined with an expression of the pass criterion, it is possible to implement similar matter to checking of a property described in a temporal logic using model checking with respect to object code.

Another characteristic related to the invention is clear from description of the present specification and accompanying drawings. In addition, a problem, a configuration, and an effect which are not described above are made clear by description of an embodiment below.

BRIEF DESCRIPTION OF DRAWINGS

FIG. 4 is a processing flow of a control content generator in the embodiment of the invention.

FIG. 5 is a processing flow of a pass criteria generator in the embodiment of the invention.

FIG. 6 is an example of a database related to a syntax pattern of a property.

FIG. 7 is a diagram illustrating an example of a sample program corresponding to a checking object, a verification model thereof, and a trace.

FIG. 8 is a diagram illustrating an example of test execution control content information and pass determination information in the embodiment of the invention.

DESCRIPTION OF EMBODIMENTS

Figure 1:
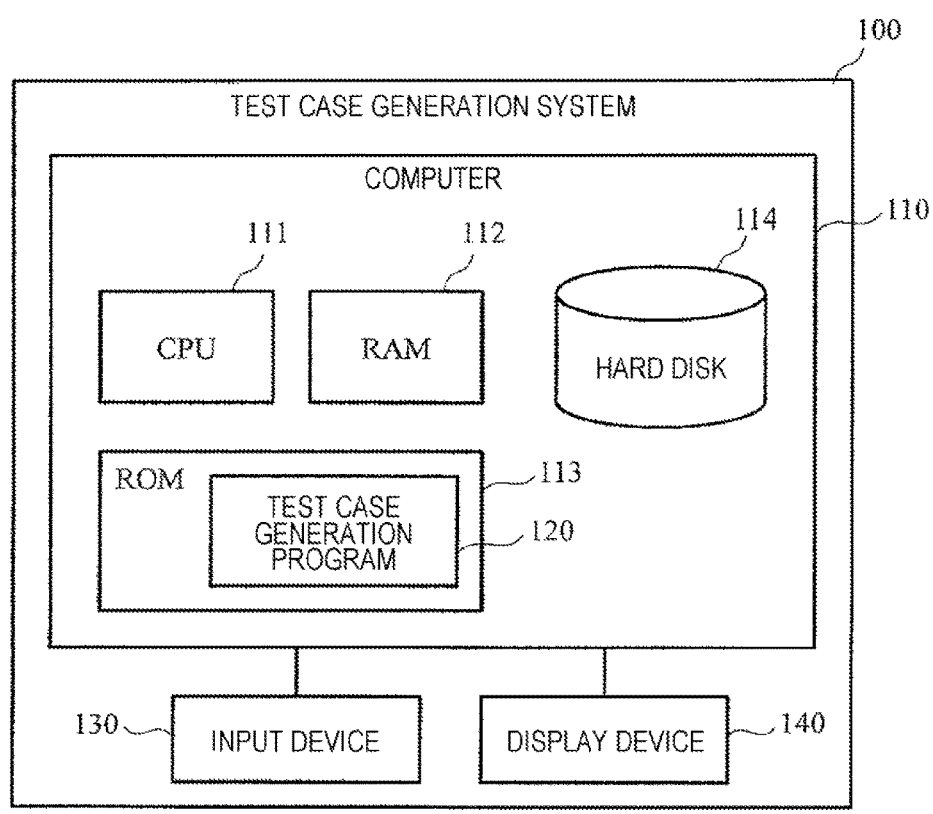
FIG. 1 is a block diagram of a system that implements a test case generation system according to the invention.

Hereinafter, an embodiment of the invention will be described with reference to accompanying drawings. Even though the accompanying drawings illustrate a specific embodiment in accordance with a principle of the invention, the accompanying drawings are provided for understanding of the invention, and are not used to restrictively interpret the invention. In addition, in the respective drawings, the same reference numeral is assigned to a common configuration.

FIG. 1 is a block diagram of a system that implements a test case generation system of the invention. The invention is a system that generates a test case used for a test system that checks an executable format or object code compiled from source code. As described in the foregoing, the test case refers to data indicating a test condition.

The invention is implemented as a software tool. Each function of the test case generation system is implemented as software. A test case generation system 100 includes a computer 110. The computer 110 includes a main arithmetic and logic unit (central processing unit (CPU)) 111, a main memory (random access memory (RAM)) 112, a storage medium (read only memory (ROM)) 113, an auxiliary memory (hard disk) 114, an input device (a key board, a pointing device, etc.) 130, and a display device (a display, a printer, etc.) 140.

Software that implements the invention is stored in the ROM 113 of the computer 110 as a test case generation program 120, and is read and executed by the CPU 111. The CPU 111 of the computer 110 executes a process defined by the test case generation program 120.

A file of source code corresponding to a source of object code which is a checking object or a file of a verification model constructed based on the source code are stored in the hard disk 114 on the computer 110. A user operation with respect to the test case generation program 120 may be performed from the input device 130 such as the key board. Output by the test case generation program 120 is performed as display on the display device 140 such as the display or data file generation in the hard disk 114. As another example, output by the test case generation program 120 may correspond to output to an external computer (not illustrated) through a network, and output by writing to an external storage medium such as a CD-ROM in a data file format. In addition, another program may be treated similarly to the test case generation program 120, and the CPU 111 may execute and output the other program.

Figure 2:
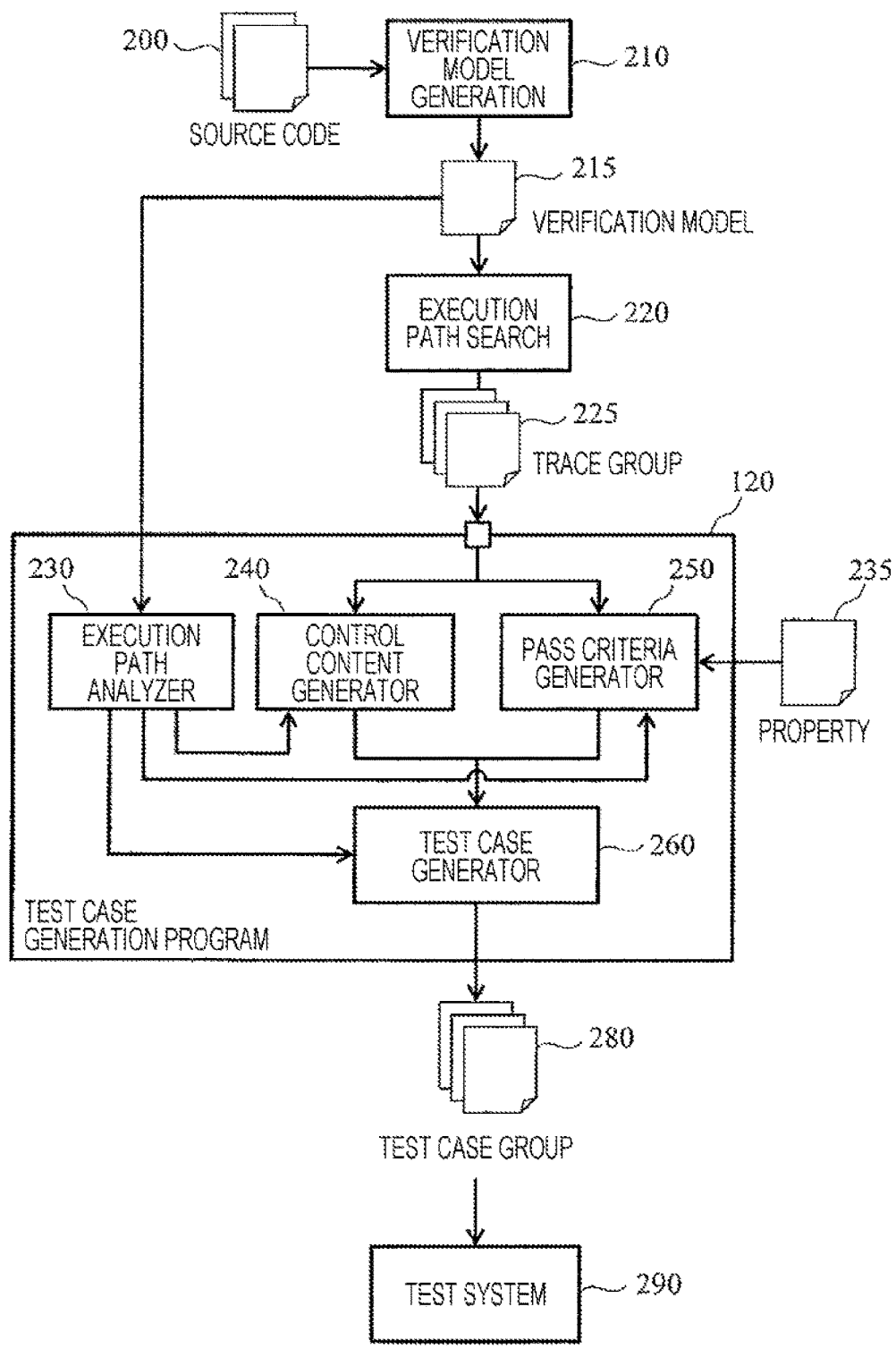
FIG. 2 is a diagram illustrating a configuration of a program related to a function of the test case generation program in an embodiment of the invention.

FIG. 2 illustrates a configuration of the test case generation program 120 stored in the ROM 113, and a configuration of another program associated with the test case generation program 120. A verification model generation program 210 generates a verification model 215 by setting, as an input, source code 200 corresponding to a source of object code which is a checking object. Herein, as described in the foregoing, the verification model 215 is obtained by expressing software specifications or source code using a format specification descriptive language.

An execution path search program 220 searches for the verification model 215 with regard to a checking object, and outputs execution path information (for example, a trace 225 described below). More specifically, the execution path search program 220 generates one or a plurality of trace groups 225 corresponding to a source of a test case as a counterexample by setting, as an input, a file obtained by adding a property or an assertion for test case generation (trace generation in the narrow sense) to the verification model 215. The execution path search program 220 uses a known model checker for generation of the counterexample. In the present embodiment, a SPIN is used as the model checker. The number of generated counterexamples may be adjusted by specifying an option on the model checker.

The test case generation program 120 generates a test case group 280 by setting the trace group 225 and a temporal logic formula 235 as an input. Herein, the temporal logic formula 235 is a property with regard to an executable format or object code which corresponds to a checking object, and is a checking formula including a time element. The test case generation program 120 has the following configuration. The test case generation program includes an execution path analyzer 230, a control content generator 240, a pass criteria generator 250, and a test case generator 260.

The execution path analyzer 230 receives the verification model 215 as an input, and analyzes a control flow including a process call relationship inside the source code 200 expressed by the verification model 215. When the source code 200 is described in the C language, the process call relationship refers to a function call tree. The execution path analyzer 230 outputs information about the control flow as an analysis result, and the information about the control flow is used inside the test case generation program 120. When the trace group 225 includes the information about the control flow, the control flow may be analyzed from the trace group 225 rather than from the verification model 215. That is, the trace group 225 may be set as an input of the execution path analyzer 230.

The control content generator 240 sets the trace group 225 as an input, and generates information related to control content of test execution (hereinafter referred to as "test execution control content information") with respect to each trace of the trace group 225. Herein, specifically, the control content of test execution refers to information about an operation that affects execution content of a test including a behavior of a program corresponding to a checking object such as an operation of data of a register of a microcomputer or a variable, processing execution of task initiation in a real-time operating system (OS) or interruption, and a trigger using an execution condition of the program corresponding to the checking object as a condition (standing by until a designated condition is satisfied). In addition, the control content of test execution and information about timing at which the operation is executed correspond to a set. The test execution control content information is defined as one or a plurality of event queues with respect to one trace.

The pass criteria generator 250 receives the trace group 225 and the temporal logic formula 235 as inputs, and outputs information related to a pass criteria (hereinafter referred to as "pass criteria information") with respect to each trace of the trace group 225. This pass criteria information includes a set of a criterion formula having no time element and timing of executing the criterion formula. In addition, in the pass criteria information, one or a plurality of pass determination event queues are defined with respect to one trace.

The test case generator 260 outputs the test case group 280 from the test execution control content information which is output by the control content generator 240 and the pass criteria information which is output by the pass criteria generator 250. The test case group 280 is in a format that can be input to a test system 290. The test case generator 260 aligns event queues of the test execution control content information and the pass criteria information as one event queue in an execution order using the information about the control flow from the execution path analyzer 230. Thereafter, the test case generator 260 creates the test case group 280 by converting the event queues aligned in the execution order into a format input to the test system.

The test case group 280 is recorded in a memory such as the hard disk 114 or a predetermined computer-readable recording medium. The test system 290 is a system that checks object code compiled from the source code 200 or an executable file. The test system 290 checks the object code or the executable file using the test case group 280. In this way, an executable format or object code corresponding to a checking object may be checked by the test case group 280 in which an expression of a temporal operator is input to a pass criteria.

Figure 3:
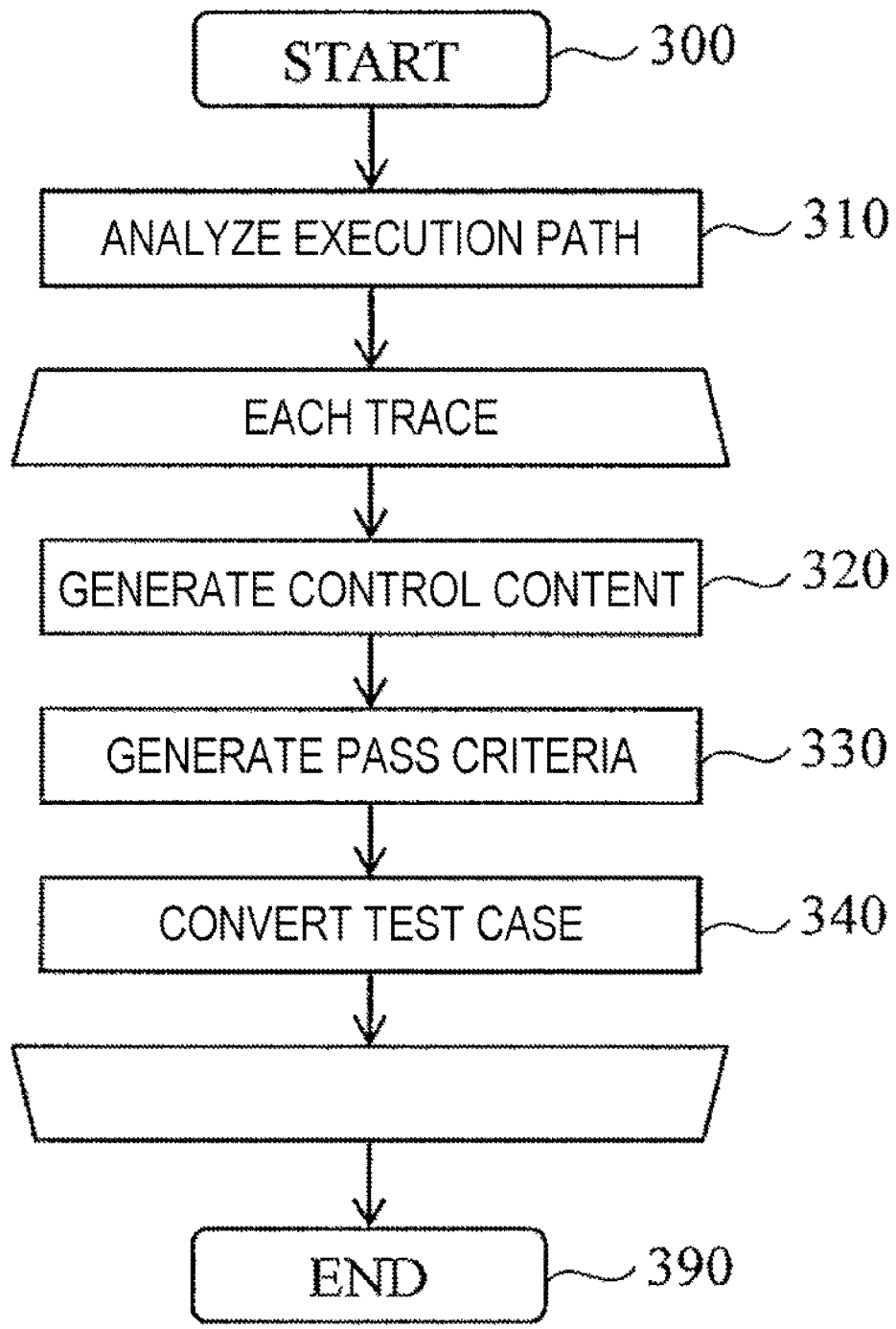
FIG. 3 is a processing flow of the test case generation program in the embodiment of the invention.

FIG. 3 is a processing flow of the test case generation program 120. First, processing starts in step 300. Subsequently, the execution path analyzer 230 analyzes a control flow of the verification model 215 and outputs information about the control flow in step 310.

Step 320 to step 340 are repeatedly executed. Step 320 to step 340 are executed with respect to each trace of the trace group 225, and thus are repeated the number of times corresponding to the number of traces included in the trace group 225. In step 320, the control content generator 240 analyzes the trace group 225, and outputs test execution control content information. In step 330, the pass criteria generator 250 outputs pass criteria information from the trace group 225 and the temporal logic formula 235. In step 340, the test case generator 260 outputs one test case of the test case group 280 from the test execution control content information and the pass criteria information. The above steps are repeated and processing ends in step 390.

FIG. 4 specifies a processing flow of step 320 by the control content generator 240. Processing starts in step 400. Step 410 to step 440 are repeated the number of times corresponding to the number of processing steps included in each trace of the trace group 225. In step 410, the control content generator 240 extracts the steps included in each trace corresponding to a processing object one by one from a head. Herein, one of processing steps to be subsequently executed is extracted by one execution among processing steps to be extracted, and content thereof is analyzed.

In step 420, the control content generator 240 determines a type of processing extracted in step 410. When the processing corresponds to input value setting by substituting a value for a variable (including a resister of a microcomputer), the operation proceeds to step 430. When the processing corresponds to process initiation, the operation proceeds to step 440. A criterion for determining that the processing corresponds to input value setting is that the processing corresponds to an assignment statement, and the substituted variable is set as an input value. A criterion for determining that the processing corresponds to process initiation is that the processing is initial processing of a function designated as a start point of a process. Whether the processing is the initial processing of the function may be determined using the control flow information from the execution path analyzer 230.

In step 430, the control content generator 240 adds a process of substituting a value for a variable to the output test execution control content information. A description location (a function, a row, etc.) of the process is assigned as information about execution timing. The description location of the process may be acquired from a trace or acquired by retracing the control flow information from the execution path analyzer 230.

In step 440, similarly to step 430, the control content generator 240 adds a control process for generating task initiation or interruption indicated by trace processing to the test execution control content information. It is presumed that information about a process (interruption, task initiation, etc.) to which each process of the verification model corresponds in the program corresponding to the checking object is set in the control content generator 240, and a control process according to the process is selected. The above steps are repeated and processing ends in step 490.

FIG. 5 specifies a processing flow of step 330 by the pass criteria generator 250. Processing starts in step 500. In step 510, the pass criteria generator 250 analyzes syntax of the input temporal logic formula 235. The analyzed syntax is expressed as internal data in the form of an abstract syntax tree (AST). In step 520, the pass criteria generator 250 compares the syntax of the temporal logic formula 235 analyzed in step 510 with a database related to a syntax pattern of a property of the pass criteria generator 250 (checking formula analysis information), and extracts a corresponding pattern.

In step 530, the pass criteria generator 250 extracts a logic formula (criterion formula) used for pass determination of a test case from the syntax of the property analyzed in step 510. In addition, the pass criteria generator 250 generates one or a plurality of pieces of information related to timing at which pass determination is performed from the control flow information from the execution path analyzer 230 and the pattern of the property determined in step 520. Finally, the pass criteria generator 250 creates pass criteria information by including the logic formula (criterion formula) and the information related to determination timing in a set. The above processing is executed, and processing ends in step 590.

Next, a description will be given of information treated in the test case generation system of the present embodiment. Some pieces of information below will be described using a "table" structure. However, the information may not be expressed by a data structure according to a table, and may be expressed by another data structure. For this reason, hereinafter, data expressed in a table form may be simply referred to as "information" to indicate that the data is independent of a data structure.

FIG. 6 illustrates a property analysis table (checking formula analysis information) 600 corresponding to a database related to a syntax pattern of a property. The property analysis table 600 is information referred to in step 510 of FIG. 5. The property analysis table 600 includes a rule for converting a property into pass criteria. For example, the property analysis table 600 is stored in a memory such as the hard disk 114, and the pass criteria generator 250 reads this information and performs the above processing. Only a property having a syntax form defined in the property analysis table 600 may be treated in the test case generation program 120.

In the present embodiment, the property analysis table 600 includes, as configuration items, a rule number 601 assigned to each pattern of a property syntax form, a property syntax form 602, pass criteria 603, and a relationship between respective pass determinations (a relationship between respective pass determinations when used for pass determination serving as one whole test case) 604. In this example, a property treated in the property analysis table 600 is linear temporal logic (LTL).

Two temporal logic formula patterns are described in the property analysis table 600. One of the patterns is G (expr), and the other one is F (expr). G is a temporal operator indicating "always", and F is a temporal operator indicating "future". In addition, herein, expr is an abstract expression indicating a logic formula. expr is a logic formula used for pass determination.

A record in which the rule number 601 is "R1" describes a rule in which "G (expr)" is converted into "expr is determined at an entrance/exit of each (executed) function" in a test case. Such a rule may be expressed by a language that describes the rule, or a program that performs conversion. In addition, the record in which the rule number 601 is "R1" specifies that "AND" of each determination result is adopted when a result of each determination based on expr is used for pass determination serving as one whole test case. Similarly, a record in which the rule number 601 is "R2" specifies that F (expr) is converted into "expr is determined at an entrance/exit of each function", and "OR" of each determination result is adopted in pass determination serving as one whole test case.

Content specified in the property analysis table 600 may be changed according to a function of a used test system. For example, when a test system can implement pass determination for each statement of a program corresponding to a checking object, the property analysis table 600 may specify that G (expr) is converted into "expr is determined after execution of each (executed) statement". In addition, the property analysis table 600 may treat a syntax form which is not indicated in FIG. 6.

FIG. 7 illustrates source code 710 of a sample program set as a checking object described in the C language, a verification model 720 in which the source code 710 is described in a model descriptive language Promela of the SPIN and to which an assertion "assert (0)" for test case generation is added, and an example of a trace 730 obtained when the verification model 720 is checked using the SPIN.

A function of the source code 710 is converted into inline macro in the verification model 720. In addition, in the source code 710, DI0 indicates a register of a digital input. Substitution of DI0 for a variable "a" in the source code is expressed as non-deterministic substitution of 0 or 1 for the variable "a" in the verification model 720. The trace 730 corresponds to a case in which 1 is substituted for the variable "a". However, to facilitate description, the trace 730 is different from a format of an actual trace (counterexample). It is presumed that the variable "a" is designated as an input to the test case generation program 120. In addition, G (x<=1) is designated as a property in the test case generation program 120.

The execution path analyzer 230 generates an AST by parsing the verification model 720, and searches the AST to detect description in which another inline function is used among respective inline functions, thereby analyzing a function call tree of the original source code 710. Herein, a call function of main→func1 is understood.

Figure 9:
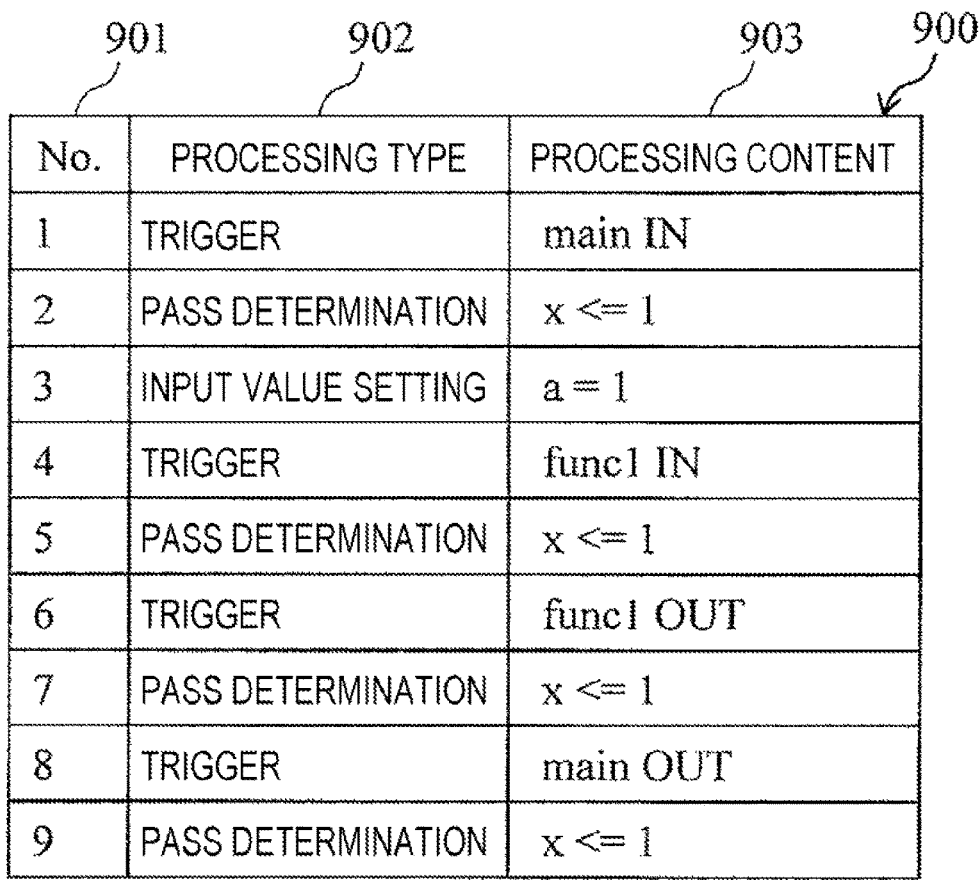
FIG. 9 is a diagram illustrating an example of an output test case in the embodiment of the invention.

FIG. 8 and FIG. 9 illustrate data output when the test case generation program 120 executes processing of FIG. 3 by setting the verification model 720 and the trace 730 as inputs. FIG. 8 illustrates test execution control content information 810 and pass criteria information 820. The test execution control content information 810 includes, as configuration items, a number 811, a type of processing of test execution control 812, and content of the processing 813. In addition, the pass criteria information 820 includes, as configuration items, a number 821, a type of processing of test execution control (pass determination is regarded as one type of the test execution control) 822, and content of the processing 823. FIG. 9 illustrates a test case 900. In FIG. 8 and FIG. 9, one row of each piece of information indicates one event or one step of a process in which a test system is executed. The test case 900 is separately converted into a format that can be input to the test system.

A description will be given of processing of the control content generator 240. The control content generator 240 receives the trace 730 as an input, and then analyzes the trace 730, and extracts a process in which 1 is substituted for an input variable "a". Further, the control content generator 240 determines that the process is implemented in a function "main" from a location of a process described in the trace 730 (corresponding to a twelfth row of reference numeral 720 of FIG. 7) and the information about the control flow. The control content generator 240 outputs the test execution control content information 810 using this determination result. In the test execution control content information 810 which is output by the control content generator 240, a length of an event queue is 2. A first event is a trigger with a condition that the function "main" is entered. A second event is a process in which 1 is substituted for the variable "a".

Next, a description will be given of processing of the pass criteria generator 250. The pass criteria generator 250 analyzes the trace 730 and the property G ($x<=1$), and outputs the pass criteria information 820. In this instance, the pass criteria generator 250 refers to a rule described in the property analysis table 600. In this example, the pass criteria generator 250 selects (refers to) a rule "R1" in the property analysis table 600. As a result, the pass criteria generator 250 sets triggers at an entrance of the function "main", an entrance of a function "func1", an exit of the function "func1", and an exit of the function "main" in accordance with the information about the control flow, and sets pass determination immediately after each trigger. That is, the output pass criteria information 820 corresponds to content in which the triggers are set at the entrance of the function "main", the entrance of the function "func1", the exit of the function "func1", and the exit of the function "main", and $x<=1$ is determined immediately after each trigger is set. Adopting AND of each determination result in pass determination serving as one whole test case is omitted in FIG. 8 and FIG. 9. However, the information is assigned to the pass criteria information 820 and the test case 900. That is, the pass criteria generator 250 adds information indicating that AND of each determination result is adopted in pass determination serving as one whole test case to the pass criteria information, and the test case generator 260 finally generates a test case by adding the information.

Next, a description will be given of processing of the test case generator 260. The test case generator 260 outputs the test case 900 from the test execution control content information 810 and the pass criteria information 820. As illustrated in FIG. 9, the test case 900 includes, as configuration items, a step number 901, a type of processing of test execution control (pass determination is regarded as one type of the test execution control) 902, and content of the processing of the test execution control 903. Herein, in the test case 900 output by the test case generator 260, the test execution control content information 810 and the pass criteria information 820 are combined into one piece of information. The test case generator 260 determines that triggers overlap at the entrance of the function "main", and integrates the overlapping part into one part.

In an example of FIG. 8 and FIG. 9, input value setting, a trigger, and pass determination are described as processing types of test execution. Additionally, description indicating interruption or task initiation is presumed to be prepared. A trigger may be used when obtaining timing of executing processing of interruption or task initiation. When a used test system can designate timing for each statement of a program, an execution end time of a statement executed immediately before processes are switched in a trace may be designated as a trigger condition. When the used test system can detect an entrance/exit of a function, there may be a scheme in which an entrance of a function of the statement and passage of predetermined time therefrom are set as a trigger condition.

According to the above description, a logic formula ($x<=1$) of a property is determined at each place of execution of a program, and thus it is possible to implement similar pass determination to "always" of the property. Determination only at an entrance/exit of a function does not fully reproduce determination at each statement of model checking. However, determination based on the determination is performed. In addition, when a rule of the property analysis table 600 is changed according to a function of a used test system, a determination frequency may be the same as that in model checking.

Next, a description will be given of a case in which a temporal operator of a property is "future". In this example, the pass criteria generator 250 selects (refers to) a rule "R2" in the property analysis table 600, and creates pass criteria information in which a trigger and pass determination are set in accordance with the information about the control flow. Thereafter, the test case generator 260 outputs the test case 900 from this pass criteria information and the test execution control content information output from the control content generator 240.

More specifically, when a temporal operator of an input property is "future", adoption of OR of each determination result in pass determination serving as one whole test case is specified in the test case 900, and a trigger of pass determination is added as a final event. Herein, it is presumed that F ($x>1$) is designated as a property in the test case generation program 120. In the case of F ($x>1$), a trigger with a condition of $x>1$ is added to an end of the test case 900. A timeout time of a trigger is set in the test case generation program 120, and is assigned to the test case 900 (not described in the figure). Whether a trigger with a condition of a logic formula has been executed is determined and recorded similarly to the pass criteria in the test system 290. In addition, a determination result thereof is used for pass determination of one whole test case in the test system 290. According to the above description, in a case in which a logic formula ($x>1$) of a property is satisfied at one or more places during execution of a program, the case may be detected. Thus, similar pass determination to "future" of the property may be implemented.

According to the above description, when object code is checked, a temporal logic formula may be used as pass criterion. In this way, an expression of a temporal operator such as "always" or "future" may be adopted to the pass criteria. In addition, when a temporal logic formula is adopted to a pass criterion in test case generation that applies model checking, similar checking to model checking with respect to object code may be implemented. In this way, it is possible to achieve a decrease in defect of software and an improvement in reliability of a system.

The invention is not restricted to the above-described embodiment, and various modified examples are included. The above embodiment has been described in detail to facilitate understanding of the invention, and may not include all described configurations. In addition, a portion of a configuration of an embodiment may be replaced by a configuration of another embodiment. Further, a configuration of an embodiment may be added to a configuration of another embodiment. Furthermore, with respect to a portion of a configuration of each embodiment, another configuration may be added/deleted/replaced.

Each configuration, function, and the like described above may be implemented in software by a processor analyzing and executing a program that implements each function. Information about the program that implements each function may be stored in a recording device or a recording medium. In addition, data of a test case having a data structure illustrated in FIG. 9 may be stored in a recording device or a recording medium.

REFERENCE SIGNS LIST 100 test case generation system
110 computer
111 CPU
113 ROM
114 hard disk
120 test case generation program
130 input device
140 display device
200 source code
210 verification model generation program
215 verification model
220 execution path search program
225 trace group
230 execution path analyzer
235 temporal logic formula
240 control content generator
250 pass criteria generator
260 test case generator
280 test case group
290 test system
600 property analysis table
710 source code
720 verification model
730 trace
810 test execution control content information
820 pass criteria information
900 test case

The invention claimed is:

1. A test case generation method executed by a processor coupled to memory, the method comprising:
generating, by the processor, information related to test execution control content from execution path information searched from a model of an executable file or object code corresponding to a checking object;
generating, by the processor, information related to pass criteria including a set of a criterion formula having no time element and a timing of executing the criterion formula from the execution path information, and a checking formula including a time element with respect to the checking object;
generating, by the processor, a test case having the pass criteria corresponding to the checking formula from the information related to the test execution control content and the information related to the pass criteria; and
generating, by the processor, the information related to the pass criteria with reference to checking formula analysis information including a rule for converting the checking formula into the pass criteria,
wherein responsive to the time element of the checking formula corresponding to a meaning of "always", adding, by the processor, first information indicating adoption of AND of a determination result of the pass criteria to the information related to the pass criteria, and generating, by the processor, the test case by adding the first information,
wherein responsive to the time element of the checking formula corresponding to a meaning of "future", adding, by the processor, second information indicating adoption of OR of the determination result of the pass criteria to the information related to the pass criteria, and generating, by the processor, the test case by adding the second information, and
wherein the checking formula analysis information includes, as configuration items, a syntax form of the checking formula, the pass criteria, and a relationship between the pass criteria when pass determination is performed by one whole test case.

2. The test case generation method according to claim 1, further comprising:
outputting, by the processor, the test case in which a trigger of the pass criteria corresponding to the checking formula is added as a final event when the time element of the checking formula corresponds to the meaning of "future".

3. The test case generation method according to claim 1, further comprising:
analyzing, by the processor, information about a control flow from the model.

4. The test case generation method according to claim 3, further comprising:
generating, by the processor, the test case by aligning the information related to the test execution control content and the information related to the pass criteria using the information about the control flow.

5. The test case generation method according to claim 3, further comprising:
generating, by the processor, the information related to the test execution control content using the information about the control flow.

6. The test case generation method according to claim 3, further comprising:
generating, by the processor, the information related to the pass criteria using the information about the control flow.

7. A test case generation system comprising:
a processor coupled to memory, the processor configured to:
generate information related to test execution control content from execution path information searched from a model of an executable file or object code corresponding to a checking object;
generate information related to pass criteria including a set of a criterion formula having no time element and a timing of executing the criterion formula from the execution path information, and a checking formula including a time element with respect to the checking object; and
generate a test case having the pass criteria corresponding to the checking formula from the information related to the test execution control content and the information related to the pass criteria,
wherein responsive to the time element of the checking formula corresponding to a meaning of "always", the processor adds first information indicating adoption of AND of a determination result of the pass criteria to the information related to the pass criteria, and generates the test case by adding the first information,
wherein responsive to the time element of the checking formula corresponding to a meaning of "future", the processor adds second information indicating adoption of OR of the determination result of the pass criteria to the information related to the pass criteria, and generates the test case by adding the second information, wherein the processor generates the information related to the pass criteria with reference to checking formula analysis information including a rule for converting the checking formula into the pass criteria, and wherein the checking formula analysis information includes, as configuration items, a syntax form of the checking formula, the pass criteria, and a relationship between the pass criteria when pass determination is performed by one whole test case.

8. The test case generation system according to claim 7, wherein the processor outputs the test case in which a trigger of the pass criteria corresponding to the checking formula is added as a final event when the time element of the checking formula corresponds to the meaning of "future".

9. The test case generation system according to claim 7, wherein the processor analyzes information about a control flow from the model.

10. The test case generation system according to claim 9, wherein the processor generates the test case by aligning the information related to the test execution control content and the information related to the pass criteria using the information about the control flow.

11. The test case generation system according to claim 9, wherein the processor generates the information related to the test execution control content using the information about the control flow.

12. The test case generation system according to claim 9, wherein the processor generates the information related to the pass criteria using the information about the control flow.

* * * * *